United States Patent [19]

Auclair

[11] 4,321,139
[45] Mar. 23, 1982

[54] FILTERING UNIT FOR BIOLOGICAL FLUIDS

[75] Inventor: Claude Auclair, Soulanges, Canada

[73] Assignee: American Home Products Corporation, New York, N.Y.

[21] Appl. No.: 147,032

[22] Filed: May 7, 1980

[51] Int. Cl.³ .......................................... B01D 35/02
[52] U.S. Cl. ................... 210/232; 210/474; 210/497.3; 210/927; 422/101
[58] Field of Search .................. 210/474, 497 R, 455, 210/475, 476, 497.3, 232, 927; 422/101, 102

[56] References Cited

U.S. PATENT DOCUMENTS

| | | | |
|---|---|---|---|
| 169,092 | 10/1875 | Dillon | 210/497.3 |
| 185,866 | 1/1877 | More | 210/474 |
| 203,847 | 5/1878 | More | 210/497.3 |
| 618,996 | 2/1899 | Riedel | 210/474 |
| 1,115,016 | 10/1914 | Pheils | 210/497.3 |
| 1,193,970 | 8/1916 | Bacher | 210/497.3 |
| 1,471,807 | 10/1923 | Roosevelt | 210/497.3 |
| 1,671,606 | 5/1928 | Pierce | 210/497.3 |
| 1,780,774 | 11/1930 | White | 210/497.3 |
| 1,781,964 | 11/1930 | Thomas | 210/497.3 |
| 1,937,203 | 11/1933 | Nash | 210/497.3 |
| 2,521,094 | 9/1950 | Rein | 210/497 |
| 2,625,270 | 1/1953 | de Armas | 210/474 |
| 2,641,365 | 6/1953 | Lundeen | 210/497.3 |
| 2,987,472 | 6/1961 | Kollsman | 210/497 R |
| 3,266,411 | 8/1966 | Oakley | 210/497.3 |
| 3,288,318 | 11/1966 | Corbin | 422/102 |
| 3,449,081 | 6/1969 | Hughes | 422/101 |
| 3,483,768 | 1/1970 | Rigopulos | 210/497.3 |
| 3,483,812 | 12/1969 | Gast | 210/474 |
| 3,615,708 | 10/1971 | Abile-Gal | 210/474 |
| 3,990,852 | 11/1976 | Piazzi | 422/102 |
| 4,014,653 | 3/1977 | Gianos | 422/101 |
| 4,208,187 | 6/1980 | Givner | 23/915 |

FOREIGN PATENT DOCUMENTS 1242566 8/1960 France .................. 210/474
2714 of 1883 United Kingdom ............... 210/474

OTHER PUBLICATIONS

PCT/US/00257, Tokar, 11/29/79.

*Primary Examiner*—Ernest G. Therkorn
*Attorney, Agent, or Firm*—Adley F. Mandel

[57] ABSTRACT

Herein is described a filtering unit for biological fluids. The filtering unit is composed of an open top container, a cover for the container, a filter which is in contact with the cover and extends downwardly into the container and an aperture in the cover through which the filtered fluid is withdrawn. The filtering unit provides a sample of the filtered fluid using an inexpensive apparatus and can be used by unskilled operators.

6 Claims, 3 Drawing Figures

FILTERING UNIT FOR BIOLOGICAL FLUIDS

BACKGROUND OF THE INVENTION

This invention relates to a filter unit for reverse filtration of a liquid sample, especially a biological fluid.

In many tests for the determination of specific components in a biological fluid, a filtered sample of the fluid must be used to avoid any interference in the test by solid matter. Usually, the fluid is poured into a filtering unit wherein the filtered fluid, with the aid of gravity, drops to a container below. The pouring of the unfiltered fluid into the filtering unit can often be unpleasant for some people because of its odors and appearance. Furthermore, unskilled operators will frequently spill the biological fluid.

The filtering unit of this invention provides a sample of a filtered liquid in a simple one step operation and overcomes many of the above noted disadvantages. The unit permits the operation to be performed quickly and efficiently with minimal operation instructions. The unit can be produced readily from inexpensive materials so that it can be disposed after use.

A rather extensive number of various filtering devices are described and known. Representative filtering devices are described in the following reports: P. N. Rigopulos, U.S. Pat. No. 3,483,768, Jan. 6, 1970; J. Dillon, U.S. Pat. No. 169,092, Oct. 26, 1875; H. More, U.S. Pat. No. 185,866, Jan. 2, 1877; H. More, U.S. Pat. No. 203,847, May 21, 1878; J. W. Pheils, U.S. Pat. No. 1,115,016, Oct. 27, 1914; P. J. Bacher, U.S. Pat. No. 1,193,970, Aug. 8, 1916; J. A. Roosevelt et. al., U.S. Pat. No. 1,471,807, Oct. 23, 1923; E. F. Pierce, U.S. Pat. No. 1,671,606, May 29, 1928; E. F. White, U.S. Pat. No. 1,780,774, Nov. 4, 1930; G. F. Thomas et al., U.S. Pat. No. 1,781,964, Nov. 18, 1930; C. V. Lundeen, U.S. Pat. No. 2,641,365, June 9, 1953; C. Oakley, U.S. Pat. No. 3,266,411, Aug. 16, 1966 and A. D. Nash, U.S. Pat. No. 1,937,203, Nov. 28, 1933. The above described filtering devices differ in form and function when compared to the filtering unit of this invention.

SUMMARY OF THE INVENTION

This invention provides a filter unit adapted for reverse filtration of a liquid sample comprising a container with an open top defining a chamber for receiving a liquid sample to be filtered; cover means for closing the top of the container; a conical filter element, disposed within said chamber and extending below the cover means, forming an inner chamber defined by the inner surfaces of the filter element and the cover means; means associated with the cover means and cooperating with the upper rim of the filter element for maintaining the filter element in juxtaposition with the cover means; and an aperture in said cover means disposed over said inner chamber for withdrawing a filtered liquid sample.

In a preferred embodiment of the filter unit, the cover means is circular, the container is cylindrical, the apex of the conical filter element extends into the lower portion of the chamber, the means associated with the cover means is a groove means frictionally engaging the filter element, and the aperture has a sealing means associated with the aperture for covering the aperture.

DETAILED DESCRIPTION OF THE INVENTION

Figure 1:
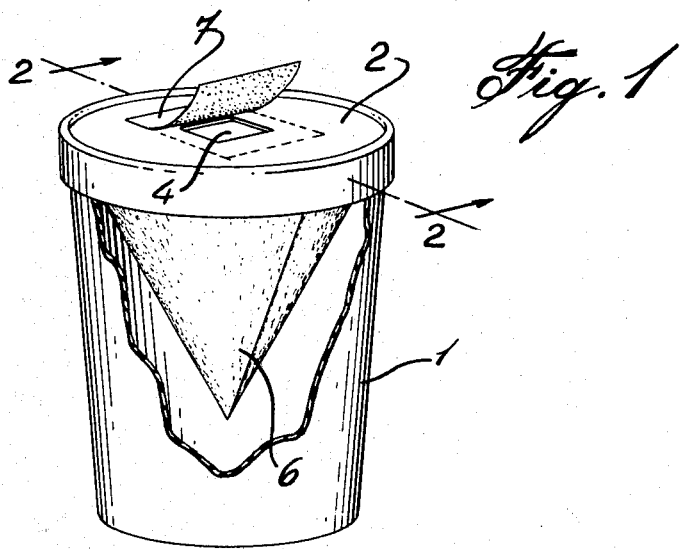
FIG. 1 is a perspective view, of an embodiment of the filtering unit with a portion of the container cut away to reveal the filter element.
Figure 2:
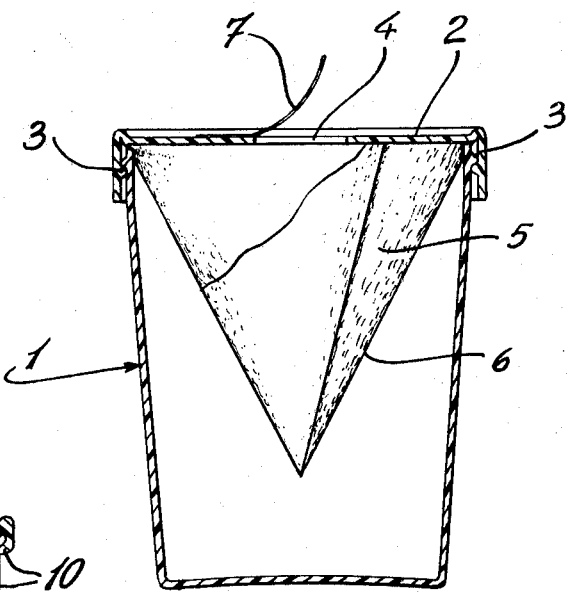
FIG. 2 is a vertical cross-sectional view of the embodiment of FIG. 1 taken along line 2—2.
Figure 3:
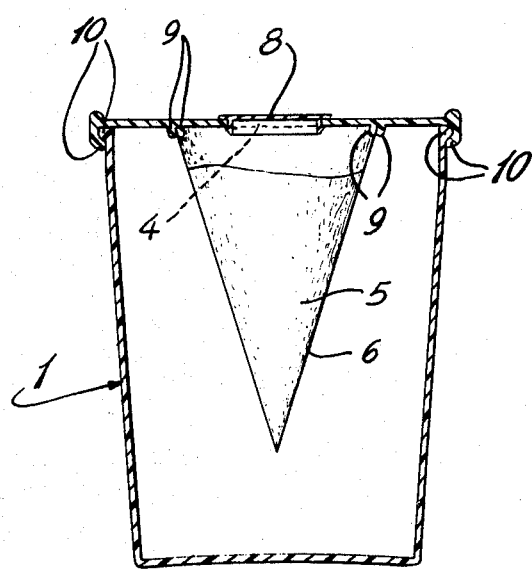
FIG. 3 is a verticle cross-sectional view of another embodiment of the filtering unit.

Referring now to the drawings and particularly to FIGS. 1 and 2, there is illustrated a filtering unit comprising a cylindrical container 1 with an open top defining a chamber for receiving a liquid sample to be filtered and a complemental circular overlying cover 2. The cover 2 can either lie on the container 1 or be removably secured to the container 1 by complemental snap fittings or screw threads. Preferably, the cover 2 is releasably secured to the container 1 with screw threads 3. In FIG. 3 cover 2 is releasably secured to container 1 with complemental snap fittings 10. The cover and container are each formed of a suitable material, preferably a rigid plastic, which is unaffected by the biological fluid.

The cover 2 is fitted with an aperture 4 over the interior chamber 5 formed by the filter material 6. Aperture 4 can be of any convenient shape, i.e. circular, rectangular and the like. The aperture 4 serves as a viewing port or window for the interior of the filter chamber 5 and also as an opening through which the filtered fluid can be withdrawn. A removable adhesive seal 7 closes or covers the aperture 4. The seal serves to prevent dust or other foreign material from entering the interior chamber 5. Also, the seal 7 prevents spillage of the fluid if the filtering unit is tipped over or transported. However, if desired, the seal 7 can be completely omitted from the filtering unit and the function of the filtering unit is not affected. Thus, the seal 7 only acts as a convenience in some situations. The removable adhesive seal can be formed of an adhesive tape or adhesive aluminium foil which can be pulled away from the cover 2 to open the aperture. Another suitable openable seal can be hinged to the cover and closed using complemental snap fittings with the cover. FIG. 3 illustrates another removable seal 8 wherein seal 8 is a separate cap having complemental snap fittings with the cover 2.

FIGS. 1, 2 and 3 also illustrate a conical filter wherein the edges of the filter are held in contact with the cover 2 and the filter extends from the cover 2 to form its apex in the lower portion of the container 1. Chamber 5 is enclosed by filter 6 and cover 2. Various means can be used to keep the filter 6 in contact with the cover 2. In FIG. 2 the filter is held in contact with a groove in the cover by friction resulting from the pressure of the top of the container against the filter. FIG. 3 illustrates another method of holding the filter in contact with the cover wherein projections 9 from cover 2 grasp the paper 6. The filter can also be glued or sealed to the cover.

Although the filter illustrated in FIGS. 1, 2 and 3 is conical, the shape of the filter is not critical, for example, a cylinder having a closed bottom can be used with equally good results. The only requirement concerning the shape of the filter is that a chamber 5 be defined. A conical shaped filter is preferred because of its low cost of manufacture and ease of preparation. A conical filter is readily obtained by folding a round and flat piece of filter material. Also the round and flat filter material can be folded to obtain a fluted conical filter. The type of filter for use in the filtering unit depends upon the fluid to be filtered and the solid material to be removed from the fluid. Preferred filters are selected from commercially available filter papers. For example, Whatman ® No. 1 filter paper efficiently filters urine when used with the invention.

In use, the filtering unit constitutes an integrated package which can be easily used by unskilled operators. In the first step, the cover means along with the filter element is removed from the container. The container is then filled to about one-half to three-quarters its capacity or an amount sufficient to be above the bottom of the filter chamber after the cover means along with the filter element has been replaced. After replacing the cover means and filter element, the fluid filters through the filter element into the filter chamber. The filtered fluid is withdrawn from the filter chamber through the aperture in the cover means. The aperture also serves as a viewing port to see the amount of filtered fluid in the filter chamber. Hence, the elements of the filtering unit are combined so that fluid placed in the open container will filter into the filter chamber after the cover means and filter element are replaced on the top of the container. Withdrawal of the filtered fluid is readily achieved using a pipette.

The filtering unit can be used to filter any biological fluid. It is especially useful for filtering urine. A sample of filtered urine is required when the urine is analyzed for the amount of human chorionic gonadotropin (present during pregnancy and certain types of cancer), luteinizing hormone (present at time of ovulation) and glucose (present when a person is diabetic). It can also be used to obtain a protein-free solution for analysis by using an ultrafiltration membrane of a specific molecular cut-off.

I claim:

1. A filter unit adapted for reverse filtration of a liquid sample comprising a container with an open top defining a chamber for receiving a liquid sample to be filtered; cover means for closing the top of the container; a conical filter element, disposed within said chamber and extending below the cover means, forming an inner chamber defined by the inner surfaces of the filter element and the cover means; means independent of said container and associated with the cover means and cooperating with the upper rim of the filter element for maintaining the filter element in juxtaposition with the cover means; an aperture is said cover means disposed over said inner chamber for withdrawing a filtered liquid sample and sealing means associated with said aperture for covering said aperture.

2. The filter unit of claim 1 wherein the means associated with the cover means comprises groove means frictionally engaging the filter element.

3. The filter unit of claim 1 wherein the means associated with the cover means comprises at least one projection means frictionally engaging the filter element.

4. The filter unit of claim 1 wherein the sealing means comprises hinged means.

5. The filter unit of claim 1 wherein the sealing means comprises removable adhesive means.

6. The filter unit of claim 1 wherein the cover means is circular, the container is cylindrical and the apex of said conical filter element extends into the lower portion of the chamber.

* * * * *